United States Patent [19]

Suyama

[11] Patent Number: 4,841,449
[45] Date of Patent: Jun. 20, 1989

[54] DIRECTION FINDER
[75] Inventor: Mitiyo Suyama, Hyogo, Japan
[73] Assignee: Mitsubishi Denki Kabushiki Kaisha, Tokyo, Japan
[21] Appl. No.: 105,787
[22] Filed: Oct. 8, 1987
[30] Foreign Application Priority Data
  Oct. 8, 1986 [JP] Japan .................. 61-240687
[51] Int. Cl.⁴ ............................. G01C 17/38
[52] U.S. Cl. ................ 364/449; 364/571.04; 364/457; 33/356
[58] Field of Search .......... 364/449, 457, 571.04; 33/361, 355 R, 356, 357; 324/244

[56] References Cited
U.S. PATENT DOCUMENTS
  4,414,753 11/1983 Moulin et al. ............ 33/357
  4,416,067 11/1983 Scherer et al. ........... 33/357
  4,546,550 10/1985 Marchent et al. ......... 33/356
  4,672,565 6/1987 Kuno et al. .............. 33/356
  4,729,172 3/1988 Alberter et al. .......... 33/356
  4,733,179 3/1988 Bauer et al. ............. 33/356
  4,738,031 4/1988 Alberter et al. .......... 33/356

Primary Examiner—Gary Chin
Attorney, Agent, or Firm—Sughrue, Mion, Zinn, Macpeak, and Seas

[57] ABSTRACT

A direction finder includes a correction amount amending means which amends automatically correction amounts necessary to cancel out an influence of varying magnetization field of a vehicle on the basis of magnetic detection signals obtained before and after the vehicle changes its moving direction by an angle larger than a predetermined value.

1 Claim, 7 Drawing Sheets

DIRECTION FINDER

BACKGROUND OF THE INVENTION

The present invention relates to a direction finder for use in a navigation system of a vehicle, which is capable of finding a moving direction of the vehicle on the basis of terrestrial magnetism.

Figure 1:
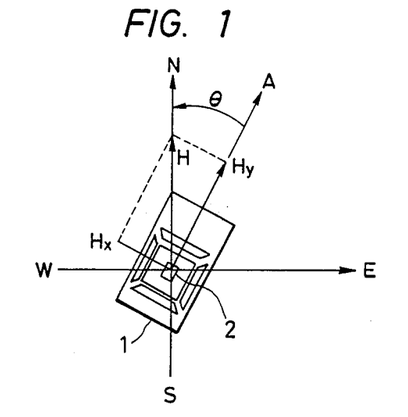
FIGS. 1 and 2 show a principle of a conventional direction detection in a case where there is no disturbing magnetizing field.
Figure 2:
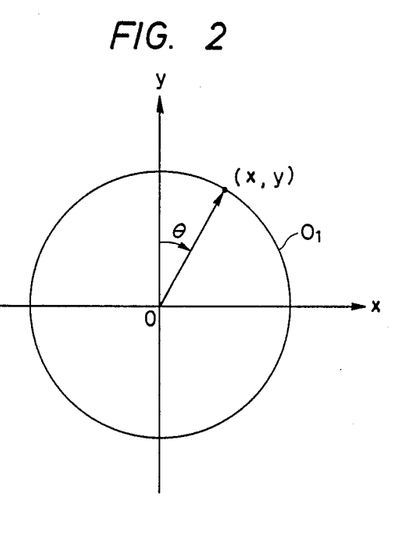

There have been many navigation systems of this type and they are based on a principle which is shown in FIGS. 1 and 2. In FIG. 1, a horizontal component H of terrestrial magnetism, which is referred to as "terrestrial magnetism H" hereinafter, is detected by a terrestrial magnetism sensor 2 mounted on the vehicle 1, e.g., an automobile, whose heading makes an angle $\theta$ with respect to the direction of terrestrial magnetism H, i.e., north. That is, the sensor 2 detects a field component $H_y(=\cos\theta)$ of the magnetism H which is in parallel to the moving direction A of the vehicle 1 and a field component $H_x(=\sin\theta)$ orthogonal to the direction A and provides electric signals x and y in the form of, for example, voltage signals corresponding thereto. The electric signals x and y are amplified suitably. Thus, the signals x and y can be expressed by $$x = KH_x = KH \sin\theta \quad (1a)$$

$$y = KH_y = KH \cos\theta \quad (1b)$$

where K is a magnetism to voltage conversion coefficient.

The detected signals x and y when the field components $H_x$ and $H_y$ are zero are calibrated to zero so that the magnitudes of the signals x and y are in proportion to the intensities of the components $H_x$ and $H_y$, respectively, and can be used as reference values, as shown by the above equations.

FIG. 2 shows a x-y coordinates system on which points each defined by a pair of electric signals x and y are plotted. A locus of the plot, when the vehicle 1 moves around once, describes a circle 1 and the angle $\theta$ between the moving direction A of the vehicle 1 and the terrestrial magetism H becomes as shown in FIG. 2. Therefore, it is given by $$\theta = \tan^{-1}(x/y) \quad (2)$$

The direction of the terrestrial magnetism H is not always coincident with the geographic north and there is an error, i.e., declinatiin therebetween. The declination depends on a geographical area of the earth. In this description, however, it is assumed that there is no declination for simplicity of explanation.

It has been known that, due to magnetization of magnetic material forming various components of the vehicle, the angle $\theta$ calculated according to the equation (2) is not always correct.

Figure 3:
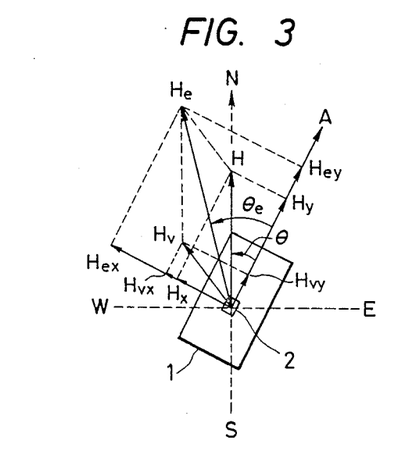
FIGS. 3 and 4 show a principle of a conventional direction detection in a case where there is a disturbing magnetizing field.
Figure 4:
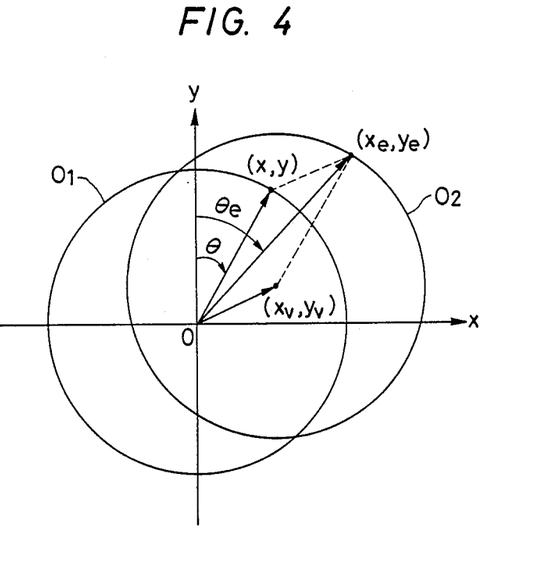

Describing this in greater detail with reference to FIGS. 3 and 4, the vehicle 1 is subjected to a magnetic field $H_v$ shown in FIG. 3 produced by those magnetized components. With the magnetic field $H_v$, the magnetic field to be detected by the terrestrial magnetism sensor 2 becomes a composite magnetic field $H_e$ of the terrestrial magnetism H and the field $H_v$. Coordinates (x,y), $x_v$, $y_v$) and ($x_e$, $y_e$) of signals from the sensor 2 which correspond to coordinates ($H_x$, $H_y$), ($H_{vx}$, $H_{vy}$) and ($H_{ex}$, $H_{ey}$) and ($H_{ex}$, $H_{ey}$) of the magnetic field H, $H_v$ and $H_e$ are shown, in FIG. 4, on a x-y perpendicular coordinate system. Thus, the signals $x_e$ and $y_e$ from the sensor 2 can be represented by:

$$x_e = x_v = KH \sin\theta + x_v \quad (3a)$$

$$y_e = y + y_v = KH \cos\theta + y_v \quad (3b)$$

and an angle obtained from the signals $x_3$ and $y_e$ according to the equation (2) becomes:

$$\tan^{-}(x_e/y_e) \quad (4)$$

Thus, a true angle $\theta$ can not be obtained.

However, since a field $H_v$ is produced by the vehicle 1 itself acting as a permanent magnet and an intensity and direction thereof with respect to the moving direction A of the vehicle 1 are constant, the coordinates ($s_v$, $y_v$) of the signal corresponding to the magnetic field $H_v$ shown in FIG. 4 is kept unchanged even if the direction A is changed. Therefore, a locus of the coordinates ($x_e$, $y_e$) of the detection signal when the vehicle 1 runs once along a circle route becomes a circle $0_2$ having a center point ($x_v$,$y_v$) as is clear from the equations (3a) and (3b). Therefore, by obtaining the center coordinates ($x_v$,$y_v$) of the circle $0_2$ from the detection signals $x_e$ and $y_e$, a true angle $\theta$ can be obtained easily from the following equation:

$$\theta = \tan^{-1}[(x_e - x_v)/(y_e - y_v)] \quad (5)$$

Japanese Patent Application Laid-open No. 148210/1982 discloses a technique by which a true angle $\theta$]is obtained by cancelling out influences of the magnetic field $H_v$ on the basis of the principle mentioned above. In detail, among the detection signals x and y obtained from the terrestrial magnetism sensor 2 when the vehicle 1 circles once, maximum values $x_{max}$ and $y_{max}$ and minimum values $x_{min}$ and $y_{min}$ in the respective axes of the x-y perpendicular coordinate system are stored and the detection signals $x_v$ and $y_v$ corresponding to the magnetic field $H_v$ is obtained as coordinates of the center of the circular locus $0_2$, according to the following equations:

$$x_v = (x_{max} + x_{min})/2 \quad (6a)$$

$$y_v = (y_{max} + y_{min})/2 \quad (6b)$$

Therefore, by directing the vehicle 1 along a circular route within a suitable time to obtain the detection signals $s_v$ and $y_v$ corresponding to the magnetic field $H_v$, it is possible to obtain a true orientation 0 by performing an operation corresponding to equation (5).

Figure 5:
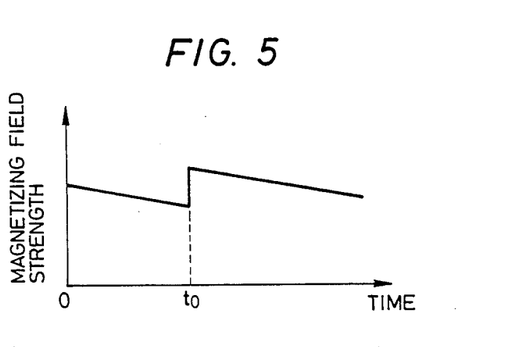
FIG. 5 is a graph illustrating a time variation of magnetizing field.

However, when the vehicle 1 is, for example, an automobile, it is subjected to vibrations during its movement. Therefore, the magnetic field $H_v$ may vary gradually as shown in FIG. 5, although the variation might be negligible when averaged over, for example, a day. In addition, when the automobile passes a rail road having a d.c. power supply system at a time instance $t_o$, it may be magnetized by a magnetic field existing between the rails and cables thereof, and thus the intensity and direction of the field $H_v$ may be considerably changed. With such a change of the field $H_v$, the automobile must circle again to obtain the signals $x_v$ and $y_v$ corresponding to the changed field $H_v$. This is very difficult to do practically.

SUMMARY OF THE INVENTION

An object of the present invention is to provide a direction finder for a movable body, by which a correction amount corresponding to a variation of a magnetization field $H_v$ can be automatically amended without special maneuvering of the movable body.

According to the present invention, the above object is achieved by provision of a correction amount amending means operable to obtain two circles according to horizontal magnetism detection signals obtained before and after the movable body changes its heading by an angle larger than a constant angle and to update a correction amount necessary to cancel out influence of the magnetization field of the movable body on the basis of a center coordinates of one of the circles which is closer to a detection signal obtained during a time when the movable body changes its heading and radii in both axis directions of a circular locus of the detection signals.

The correction amount amending means operates to amend a variation of magnetization field of the movable body with time on the basis of detection signal pairs obtained before and after the change of its heading by obtaining the center coordinates of the circle, to amend the correction amount on the basis of the center coordinates and the radii thereof, and to correct the detection signals on the basis of the amended correction amount to thereby obtain a true moving direction of the vehicle.

BRIEF DESCRIPTION OF THE DRAWINGS

FIG. 10b is a flow chart showing a correction amount amending routine in the flow chart in FIG. 10a.

DETAILED DESCRIPTION OF THE PREFERRED EMBODIMENT

Figure 6:
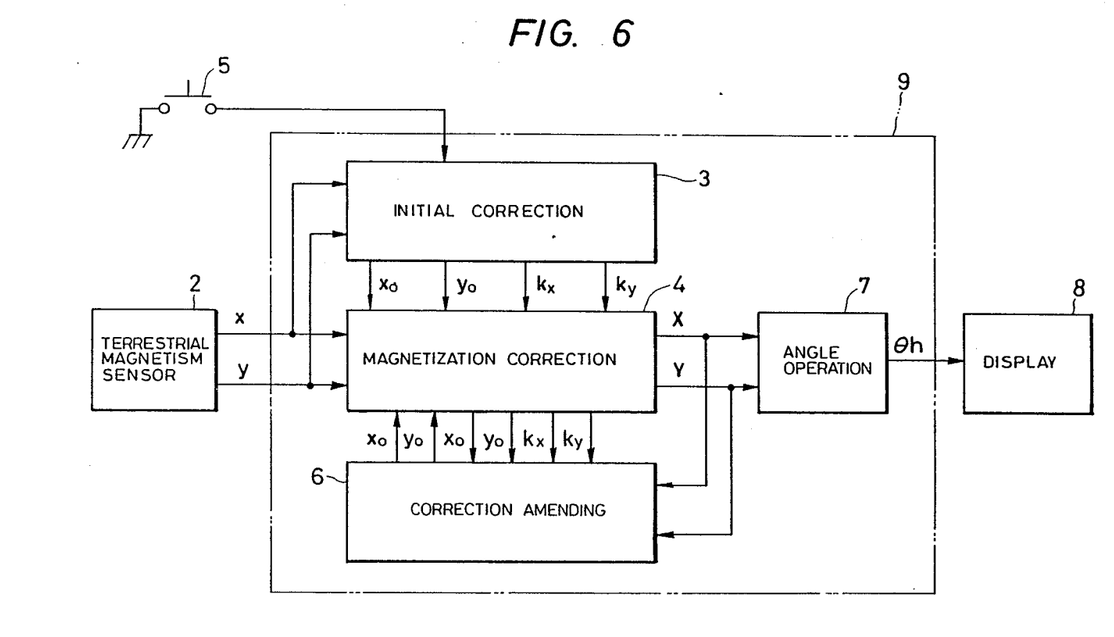
FIG. 6 is a block diagram showing an embodiment of the present invention.

In FIG. 6, which shows a block diagram of an embodiment of the present invention, a reference numeral 2 depicts a terrestrial magnetism sensor which is identical to the sensor 2 shown in FIG. 1, and an initial correction means 3 is actuated upon an operation of a switch 5 as disclosed in the aforementioned prior art. When actuated, the initial correction means 3 detects and stores detection signals x and y obtained by the terrestrial magnetism sensor 2 on the vehicle 1 while the vehicle is directed along a circular route, and obtains detection signals $x_v$ and $y_v$ corresponding to a magnetizing field $H_v$ according to the equatiions (6a) and (6b) to set them as a pair of correction amounts $x_o$ and $y_o$ for cancelling out an influence of the field $H_v$ and obtains radii $K_x$ and $K_y$ in x and y directions of a circle including an ellipse on the basis of maximum values $x_{max}$ and $y_{max}$ and the minimum values $x_{min}$ and $y_{min}$ of the respective axes in a x-y coordinate system according to the following equations:

$$K_x = (x_{max} - x_{min})/2 \tag{7a}$$

$$K_y = (y_{max} - y_{min})/2 \tag{7b}$$

A magnetizing correction means 4 operates to correct the detection signals x and y on the basis of the correction amounts $x_o$ and $y_o$ and the radii $K_x$ and $K_y$ according to the following equations:

$$X = (x - x_o)/K_x \tag{8a}$$

$$Y = (y - y_o)/K_y \tag{8b}$$

and provides a pair of corrected detection signals X and Y. A correction amount amending means 6 receives the corrected detection signals X and Y from the magnetizing correction means 4 and amends the correction amounts $x_o$ and $y_o$ suitably.

Figures 7A, 7B, 8:
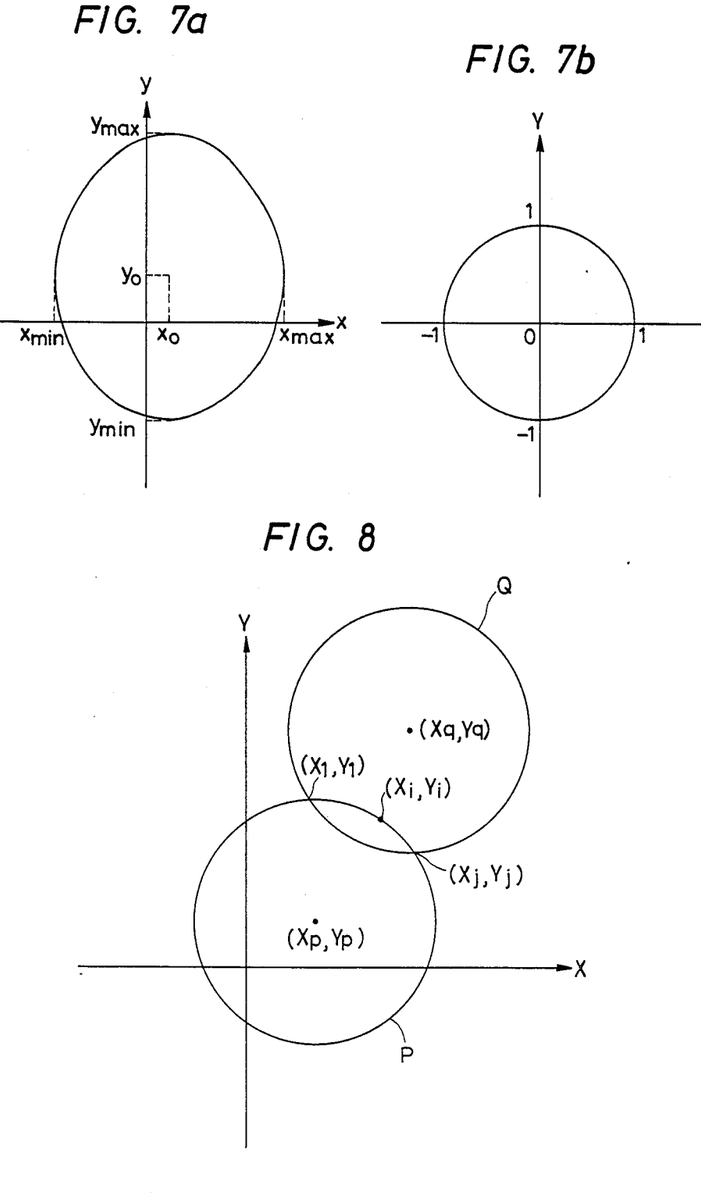
FIGS. 7a and 7b are explanatory illustrations of an operation of the magnetizing correction means in FIG. 6.
FIG. 8 is an explanatory illustration of an operation of the correction amending means in FIG. 6.

Describing a principle of operation of the correction amount amending means 6, coordinates corresponding to the corrected detection signals from the magnetizing correction means 4 will be distributed on a circle having a center at an original point of an X-Y coordinate system and radius of 1 as shown in FIG. 7b if the correction amounts $x_o$ and $y_o$ are set correctly. When the magnetizing field varies, for example, as shown in FIG. 5, the coordinates on the X-Y coordinates system corresponding to the correction signals from the magnetizing correction means 4 may be distributed on a circle P in FIG. 8. It is assumed that coordinates points on the X-Y coordinates system corresponding to the corrected detection signals obtained before and after the vehicle changes its heading are $(X_1, Y_1)$ and $(X_j, Y_j)$, respectively. There are two circles having radius of 1 which pass these two points. However, when a coordinates point $(X_i, Y_i)$ corresponding to the corrected detection signal obtained during the change of vehicle heading exists closer to either of the two circles, e.g., the circle P, the correction amount $(x_o, y_o)$ is amended by using the respective components $X_p$ and $Y_p$ of the center coordinates $(X_p, Y_p)$ of the circle P multiplied by the radii $K_x$ and $K_y$ of the circle, respectively, as an amount of variation of the magnetizing field.

In a case where the coordinate point $(X_i, Y_i)$ does exist near neither of the circles, or, a distance between the coordinates points $(X_1, Y_1)$ and $(X_j, Y_j)$ exceeds a predetermined value, the correction amount $(x_o, y_o)$ for cancelling out the influence of the magnetizing field is not amended.

The direction finder shown in FIG. 6 further includes an angle operation means 7 which receives the corrected detection signals X and Y from the magnetizing correction means 4 to calculate a moving direction $\theta h$ according to the following equation:

$$\theta h = \tan^{-1}(X/Y) \tag{9}$$

and a display means 8 for displaying the moving direction $\theta h$ from the angle operation means 7.

Figure 9:
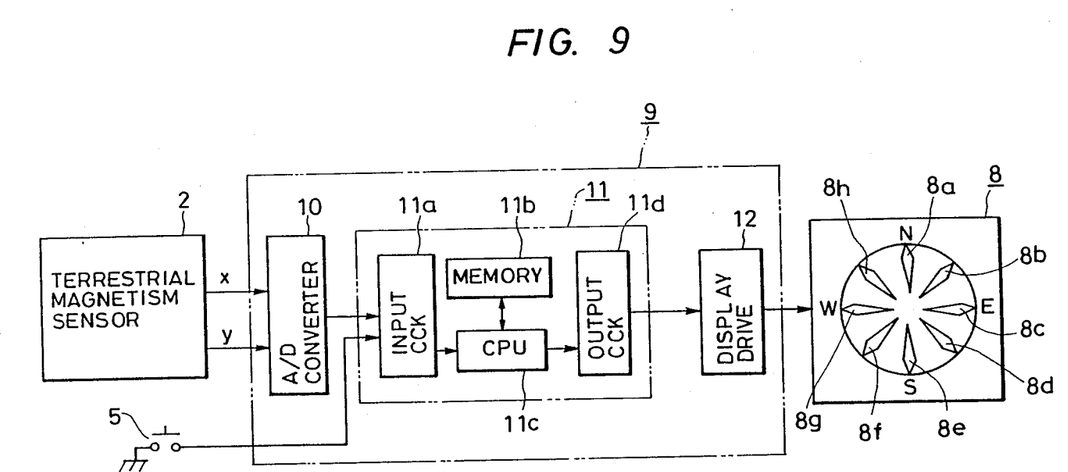
FIG. 9 is a block circuit diagram showing a main portion of the construction in FIG. 6 in greater detail.
Figure 10A:
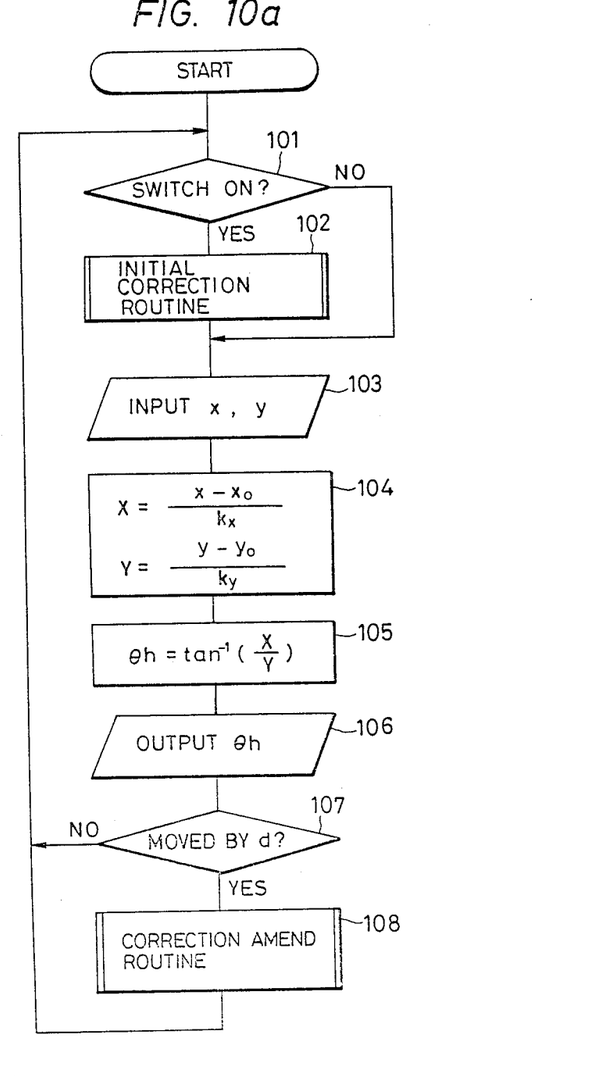
FIG. 10a is a flow chart showing a main routine to be executed by a micro-computer in FIG. 9 in detecting a moving direction.
Figure 10B:
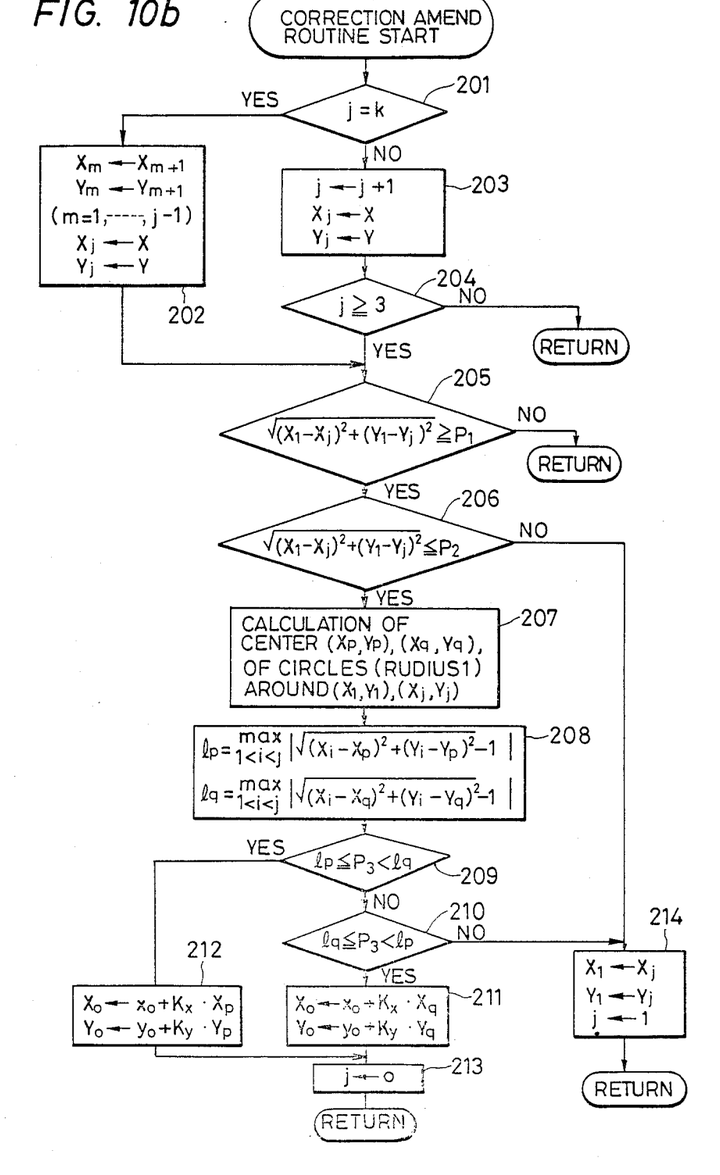

FIG. 9 is a detailed block circuit diagram of the direction finder shown in FIG. 6, in which a reference numeral 9 shows a circuit construction corresponding to a combination of the initial correction means 3, the magnetizing correction means 4, the correction amount amending means 6 and the angle operation means 7, and includes an analog-digital (A/D) converter 10 for converting the analog detection signals x and y from the terrestrial magnetism sensor 2 into digital values, a micro-computer 11 responsive to an output of the A/D converter 10 and a signal from the switch 5 to execute operations corresponding to the respective means, and a display drive means 12 for driving the display means 8 according to informations from the micro-computer 11. The micro computer 11 includes an input circuit 11a, a memory 11b, a central processing unit (CPU) 11c and an output circuit 11d. The display means 8 may be a liquid crystal display panel which is composed of display segments 8a to 8h and which responds to a signal from the display drive circuit 12 to actuate one of the segments to indicate a moving direction $\theta h$. The direction finder in FIG. 9 is of course mounted on the vehicle. A program for operating the micro-computer 11c according to the flow chart shown in FIGS. 10a and 10b is stored in the memory 11b preliminarily.

An operation of the direction finder shown in FIG. 9 will be described with reference to FIGS. 10a and 10b which are flow charts showing the operation of the micro-computer 11.

When a power source (not shown) is connected, the terrestrial magnetism sensor 2, the control circuit 9 and the display means 8 are actuated. That is, the terrestrial magnetism sensor 2 detects terrestrial magnetism H and provides the detection signals x and y which are supplied through the A/D converter 10 to the micro-computer 11. The micro-computer 11 is also actuated by connection of the power source and operates along a main routine shown in FIG. 10a from a step 101 sequentially. When the switch 5 is operated by an operator and the fact is confirmed as shown by the step 101, an initial correction routine is executed by the initial correction means 3 as shown in a step 102. In the initial correction routine, the correction amounts $x_o$ and $y_o$ and the radii $K_x$ and $K_y$ in both axis directions of the circle are obtained as in the same way as that disclosed in the Japanese Patent Application Laid-open No. 148201/1982.

Then, the magnetizing correction means 4 responds to the detection signals x and y as shown by a step 103 to obtain the corrected detection signals X and Y according to the equations (7a) and (7b) as shown by a step 104. The angle operation means 7 operates to obtain the moving direction $\theta h$ according to the equation (9) as shown by a step 105, and outputting a signal indicative of the moving direction $\theta h$ being supplied to the display drive circuit 12 as shown by a step 106. The display drive circuit 12 drives a corresponding one of the display segments 8a to 8h to indicate the moving direction $\theta h$. Thereafter, during times when the moving distance of the vehicle does not exceed the predetermined value d, the operation is returned to the step 101 and the same operations as mentioned above are repeated. The judgement of whether or not the vehicle moves beyond the distance d is performed by the micro-computer 11 on the basis of a signal from a distance sensor mounted on the vehicle.

When the vehicle movement exceeds the predetermined distance d while the operation of the magnetizing correction means 6 is repeated, as shown by a step 107, the correction amount amending means 6 performs a correction amount amending routine as shown by a step 108. This routine is shown in FIG. 10b. In FIG. 10b, it is first determined in a step 201 whether or not a limit number k of corrected detection signal pairs in the memory is equal to a stored number j of the corrected detection signal pairs to know whether or not the memory is full. If it is full, the oldest corrected signal pair $X_1$, $Y_1$ is erased and old corrected signal pairs $X_{m+1}$, $Y_{m+1}$ (m=1, ..., j—1) are shifted by one step respectively and stored as new corrected detection signal pairs $X_m$, $Y_m$. Then, the newest corrected detection signal pair X and Y is stored as $X_j$, $Y_j$ as shown by a step 202. If not full, the newest pair X, Y is stored as $X_j$, $Y_j$ as shown by a step 203 and then it is decided in a step 204 whether or not the number j is equal to or larger than 3. If it is equal to or larger than 3, the operation is returned to the main routine shown in FIG. 10a.

After the number j is decided as being equal to or larger than 3 or the processing in the step 202 completes, it is decided in a step 205 whether or not a distance $\{(X_j-X_1)^2+(Y_j-Y_1)^2\}^{\frac{1}{2}}$ between the newest pair $X_j$, $Y_j$ and the oldest pair $X_1$, $Y_1$ is equal to or larger than a first predetermined value $P_1$ and, if it is decided as being smaller than $P_1$, the operation is returned to the main routine in FIG. 10a. If it is equal to or larger than $P_1$, it is decided in a step 206 whether or not it is equal to or smaller than a second predetermined value $P_2$. If the distance is over the second value $P_2$, all of the corrected detection signal pairs except the newest pair $X_j$, $Y_j$ are erased, the newest pair being stored as $X_1$, $Y_1$, as shown in a step 214, and the operation is returned to the main routine in FIG. 10a.

If the distance between the two coordinates points is within a predetermined value and is equal to or smaller than $P_2$, center points $(X_p,Y_p)$ and $(X_q,Y_q)$ of circles P and Q which have a common radius of 1 and pass through coordinates points $(X_1,Y_1)$ and $(X_j,X_j)$ corresponding to the oldest and the newest corrected detection signal pairs, respectively, are obtained in a step 207 according to the following equations:

$$X_p=(X_1+X_j)/2+(Y_j-Y_1)[1/\{(X_1-X_j)^2+(Y_1-Y_j)^2\}-0.25]^{\frac{1}{2}} \quad (10a)$$

$$Y_p=(Y_1+Y_j)/2+(X_1-X_j)[1/\{(X_1-X_j)^2+(Y_1-Y_j)^2\}-0.25]^{\frac{1}{2}} \quad (10b)$$

$$X_q=(X_1+X_j)/2-(Y_j-Y_1)[1/\{(X_1-X_j)^2+(Y_1-Y_j)^2\}-0.25]^{1/8} \quad (10c)$$

$$Y_q=(Y_1+Y_j)/2-(X_1-Y_j)[1/\{(X_1-X_j)^2+(Y_1-Y_j)^2\}-0.25]^{\frac{1}{2}} \quad (10d)$$

Then, as shown in a step 208, maximum values $l_p$ and $l_q$ of distances from the coordinates point $(X_i, Y_i)$ corresponding to other corrected detection signal pairs $X_i$, $Y_i$ stored in the memory to the circles P and Q, respectively, are calculated according to the following equations:

$$l_q = \max_{1<i<j} |\{(X_i - X_q)^2 + (Y_i - Y_q)^2\}^{\frac{1}{2}} - 1| \quad (11a)$$

$$l_p = \max_{1<i<j} |\{(i - X_p)^2 + (Y_i - Y_p)^2\}^{\frac{1}{2}} - 1| \quad (11b)$$

Thereafter, as shown in steps 209 and 210, it is decided whether either one of the values $l_p$ and $l_q$ is equal to or smaller than a third predetermined value $P_3$ and the other is over the third value $P_3$. If it is yes, the correction amount is amended on the basis of the center coordinates and radius of the one circle by using the correction amount $x_o, y_o$, the values $X_p$, $Y_p$ corresponding to the center coordinates $(X_p, Y_p)$ of the circle P and the radii $K_x$ and $K_y$ thereof in both axis directions according to the following equations in a step 212:

$$x_o \leftarrow x_o + K_x \cdot X_p \qquad (12a)$$

$$y_o \leftarrow y_o + K_y \cdot Y_p \qquad (12b)$$

or by using the correction amount $x_o$ and $y_o$, the values $X_q$ and $Y_q$ corresponding to the center coordinates $(X_q, Y_q)$ of the circle Q and the radii $K_x$ and $K_y$ according to the following equations in a step 211:

$$x_o \leftarrow x_o + K_x \cdot X_q \qquad (12c)$$

$$y_o \leftarrow y_o + K_y \cdot Y_q \qquad (12d)$$

After the correction amount is amended, all of the corrected detection signal pairs stored in the memory are erased and the operation is returned to the main routine in FIG. 10a as shown by a step 213.

When the correction amount is not amended according to the negative decisions in the steps 209 and 210, all of the corrected detection signal pairs except the newest pair $X_j, Y_j$ are erased and the operation is returned to the main routine as shown by a step 214. When the switch 5 is not turned on after the operation is returned to the main routine, the same operation is performed while the step 102 is jumped over.

Thus, when the magnetizing field is changed, the correction amount can be automatically amended without a special maneuvering of the vehicle, provided that the latter changes the heading by an angle larger than a predetermined value.

As shown in the steps 205 and 206, the center coordinates $(X_p, Y_p)$ and $(X_q, Y_q)$ of the circles P and Q are calculated in the step 207 only when the distance between the coordinates $(X_1, Y_1)$ and $(X_j, Y_j)$ on the X-Y coordinates system is within a predetermined range so that errors of the center coordinates $(X_p, Y_p)$ and $(X_q, Y_q)$ due to the detection signals x and y including possible errors are minimized. The decisions in the steps 209 and 210 are to avoid an error in the selection of either of the circles P and Q, taking errors possibly included in the detection signals x and y into consideration.

Although in the described embodiment the circle during the round movement of the vehicle is assumed as an ellipse, it may be another type of circle such as true circle.

As mentioned hereinbefore, according to the present invention, the correction amount necessary to cancel components of the detection signal which are produced by the magnetization of the vehicle is amended on the basis of the detection signal obtained when the heading of the vehicle is changed. Therefore, even in the magnetizing field changes over time, a, the correction amount for cancelling the detection signal components due to such a magnetizing field is automatically amende suitably to obtain an exactly corrected detection signal, so that the moving direction of the vehicle can be obtained exactly.

What is claimed is:

1. A direction finder for use on a movable body, comprising:

terrestrial magnetism sensor means mounted on a movable body and operable to detect a terrestrial magnetism as a pair of magnetic field components which are parallel to a terrestrial surface and provide an orthogonal pair of detection signals corresponding thereto, respectively;

initial correction means for obtaining, on a basis of maximum and minimum values of said pair of detection signals from said terrestrial magnetism sensor means obtained as said movable body is directed along a circular route, radii of a circular locus of said movable body on a perpendicular coordinate system including coordinates of said pair of detection signals and a pair of error correction amounts for use in cancelling components of detection signals which are due to a magnetization field of said movable body;

magnetization correction means for correcting a further detected pair of detection signals from said terrestrial magnetism sensor menas, on a basis of said error correction amounts and providing a pair of corrected detection signals; and correction amount amending means for obtaining, from said pairs of detection signals, two circles having a common radius identical in length to that of a circle corresponding to said circular locus obtained by said initial correction means, said two circles passing through respective coordinate points corresponding to said pair of corrected detection signals from said magnetizing correction means before and after said movable body changes a moving direction, and for amending said error correction amounts on a basis of center coordinates and radii of said circles according to said pair of corrected detection signals obtained before and after said change of a moving direction of said movable body when a coordinate point corresponding to said corrected detection signal pair from said magnetizing correction means during a change of a moving direction of said movable body is within a predetermined distance from either of said two circles.

* * * * *